United States Patent
Benjamin

(10) Patent No.: US 11,627,158 B2
(45) Date of Patent: Apr. 11, 2023

(54) MITIGATION OF ROUTE HIJACKING TECHNIQUES IN A NETWORK

(71) Applicant: Level 3 Communications, LLC, Broomfield, CO (US)

(72) Inventor: Michael Benjamin, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 356 days.

(21) Appl. No.: 17/025,769

(22) Filed: Sep. 18, 2020

(65) Prior Publication Data

US 2021/0160278 A1     May 27, 2021

Related U.S. Application Data

(60) Provisional application No. 62/939,481, filed on Nov. 22, 2019.

(51) Int. Cl.
*H04L 29/06* (2006.01)
*H04L 9/40* (2022.01)
*H04L 9/32* (2006.01)

(52) U.S. Cl.
CPC ........ *H04L 63/1466* (2013.01); *H04L 9/3247* (2013.01)

(58) Field of Classification Search
CPC .......................... H04L 63/1466; H04L 9/3247
See application file for complete search history.

(56) References Cited

U.S. PATENT DOCUMENTS

| | | | |
|---|---|---|---|
| 2005/0135256 A1* | 6/2005 | Ball | H04L 45/04 370/238 |
| 2010/0214960 A1* | 8/2010 | Bahr | H04L 45/00 370/255 |
| 2011/0142051 A1* | 6/2011 | Bhatt | H04L 41/0853 370/392 |
| 2012/0144066 A1* | 6/2012 | Medved | H04L 45/42 709/242 |
| 2014/0281505 A1* | 9/2014 | Zhang | H04L 63/126 713/158 |
| 2016/0165530 A1* | 6/2016 | Sedlacek | H04W 48/18 370/338 |
| 2018/0295101 A1* | 10/2018 | Gehrmann | H04L 63/1441 |

* cited by examiner

*Primary Examiner* — Vance M Little

(57) ABSTRACT

Aspects of the present disclosure involve systems and methods for utilizing verified autonomous system (AS) network interconnections received via a cryptographically certified Recognized Operating Agency (ROA) object to generate an interconnect network model which may be used as a reference model to mitigate hijacking of network communications in downstream route announcements. In particular, AS networks may announce or share a cryptographically certified ROA object that includes a list of other AS networks to which the announcing network is connected. A router, server, or other networking device may receive ROA objects from multiple AS networks and generate a model or graph of the interconnectedness of the AS networks. Further, because each ROA object may be cryptographically certified or signed, the networking device may trust the information provided in the received ROA objects. The networking device may further verify announced routing information against the generated network model.

15 Claims, 6 Drawing Sheets

MITIGATION OF ROUTE HIJACKING TECHNIQUES IN A NETWORK

CROSS-REFERENCE TO RELATED APPLICATION

This application is related to and claims priority under 35 U.S.C. § 119(e) from U.S. Patent Application No. 62/939,481, filed Nov. 22, 2019 entitled "BGP HIJACKING MITIGATION," the entire contents of which is incorporated herein by reference for all purposes.

TECHNICAL FIELD

Embodiments of the present disclosure generally relate to systems and methods for implementing a telecommunications or data network, and more specifically for systems and methods for mitigation of hijacking network communications via inclusion of false autonomous system (AS) identifiers in downstream route announcements.

BACKGROUND

Telecommunication networks provide connections between network devices, network services, network computing environments, cloud services, etc. to enable or provide access to a service for a customer or enhance a customer's network in some form, among other things. For example, telecommunication networks may provide connection to and support of devices included in a large public network, such as the Internet.

To provide communication of information between devices, many telecommunications networks include a process of announcing routing information to devices within and outside the network, and then re-broadcasting or announcing the routing information to other devices. Routing information generally provides information as to how to reach a destination device or destination address, whether internal or external to the network. Through this route announcement process, devices within the network receive information of the connectivity of the network by which communication packets may be transmitted. For example, a first network, in some instances identified by a unique autonomous system (AS) number, may announce a range of Internet Protocol (IP) addresses assigned to that AS network to a second network identified by a second AS number. The first network may also announce, to the second AS network, received routing information from other AS networks connected to the first AS network. In this manner, route announcements from interconnected devices and networks may be dispersed through the interconnected networks for routing purposes. Many of the devices of the interconnected networks may also generate or alter a routing table for use in forwarding packets at the device based on the received routing information.

To some extent, the generation of routing tables for the interconnected networks is based on trust that each network shares accurate routing information. For example, a first network receiving IP addresses of a second network may assume that the second network owns or is assigned those IP addresses. However, announcing incorrect or fraudulent routing information may occur, and it should be assumed that it may occur with nefarious intent. For example, a fraudulent actor or device may announce an IP address that is owned or assigned to another party to begin receiving communications with that address. This technique is known as route or address hijacking. The stolen communications may be used to illicitly obtain information of the entity associated with the IP address, among other things. While some techniques have been developed to prevent or address route hijacking, vulnerabilities in the security of route sharing persists in some places and the threat of route hijacking thus remains.

It is with these observations in mind, among other, that aspects of the present disclosure were conceived.

SUMMARY

One aspect of the present disclosure relates to a method for managing routes of a network. The method may include the operations of accessing, at a networking device, autonomous system (AS) network interconnection information via a route announcement from a first AS network, the AS network interconnection information comprising an indication of peer AS networks interconnected with the first AS network, generating, based on the AS network interconnection information, an AS interconnect table, receiving, at the networking device, a network route comprising AS path information indicating a network path from the first AS network to at least one of a peer AS network, and transmitting, based on a verification of the AS path information to the AS interconnect table, a communication via the received route.

Another aspect of the present disclosure relates to a network device for managing routes of a network. In one implementation, the system may include a processor, a communication port receiving a route announcement from a first autonomous system (AS) network, the route announcement comprising AS network interconnection information of one or more peer AS networks interconnected with the first AS network, and a non-transitory memory comprising instructions encoded thereon. The instructions, when executed by the processor, may be operable to generate, based on the AS network interconnection information, an AS interconnect table, receive a network route comprising AS path information indicating a network path from the first AS network to at least one of the one or more peer AS networks, and transmit, based on a verification of the AS path information to AS interconnect table, a communication via the received route.

Yet another aspect of the present disclosure relates to a telecommunications network. The telecommunications network may include a server receiving autonomous system (AS) network interconnection information via a route announcement from a first AS network, the AS network interconnection information comprising an indication of peer AS networks interconnected with the first AS network and generating, based on the AS network interconnection information, an AS interconnect table, and a router receiving a network route comprising AS path information indicating a network path from the first AS network to at least one of a peer AS network and verifying, based on the AS interconnect table of the server, the AS path information.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope

DETAILED DESCRIPTION

Aspects of the present disclosure involve systems and methods for utilizing verified autonomous system (AS) network interconnections received via a cryptographically certified Recognized Operating Agency (ROA) object to generate an interconnect network model which may be used as a reference model to mitigate hijacking of network communications in downstream route announcements. In particular, AS networks may announce or share a cryptographically certified ROA object that includes a list of other AS networks to which the announcing network is connected. A router, server, or other networking device may receive ROA objects from multiple AS networks and generate a model or graph of the interconnectedness of the AS networks. Further, because each ROA object may be cryptographically certified or signed, the networking device may trust the information provided in the received ROA objects. The networking device may further verify announced routing information against the generated network model. In one instance, the announced routing information may be in the form of a Border Gateway Protocol (BGP) announcement. For example, an announced route may include an AS path field(s) that include identifiers of each AS network to reach the announced IP address. This AS path may be verified against the generated network model to ensure the authenticity of the announced route.

In one instance, a router may store the generated network model in memory and compare the AS path of a received route against the model when storing the announced route in the routing table associated with the router. In another example, the network model may be stored in an application server or other networking device. Upon receipt of an announced route, a router may transmit a request for verification of the announced route to the application server, which may return a verification of failure notification to the requesting router. In still another instance, a router may provide all announced routes to the application server. The application server may compare the announced routes to the generated network model and, upon a failure or potentially hijacked route, may return a mitigation action to the router. The mitigation action may include, but is not limited to, ignore the route, de-emphasis the route in the routing table, associate a flag with the route, generate an alarm, and the like. The router may also execute a mitigation action on the received route upon comparing the route to the generated network model. In this manner, the ROA objects associated with the AS networks and provided to other AS networks may provide an additional security feature for use in verifying the authenticity of announced network routes to prevent or mitigate route hijacking within a network.

Figure 1A:
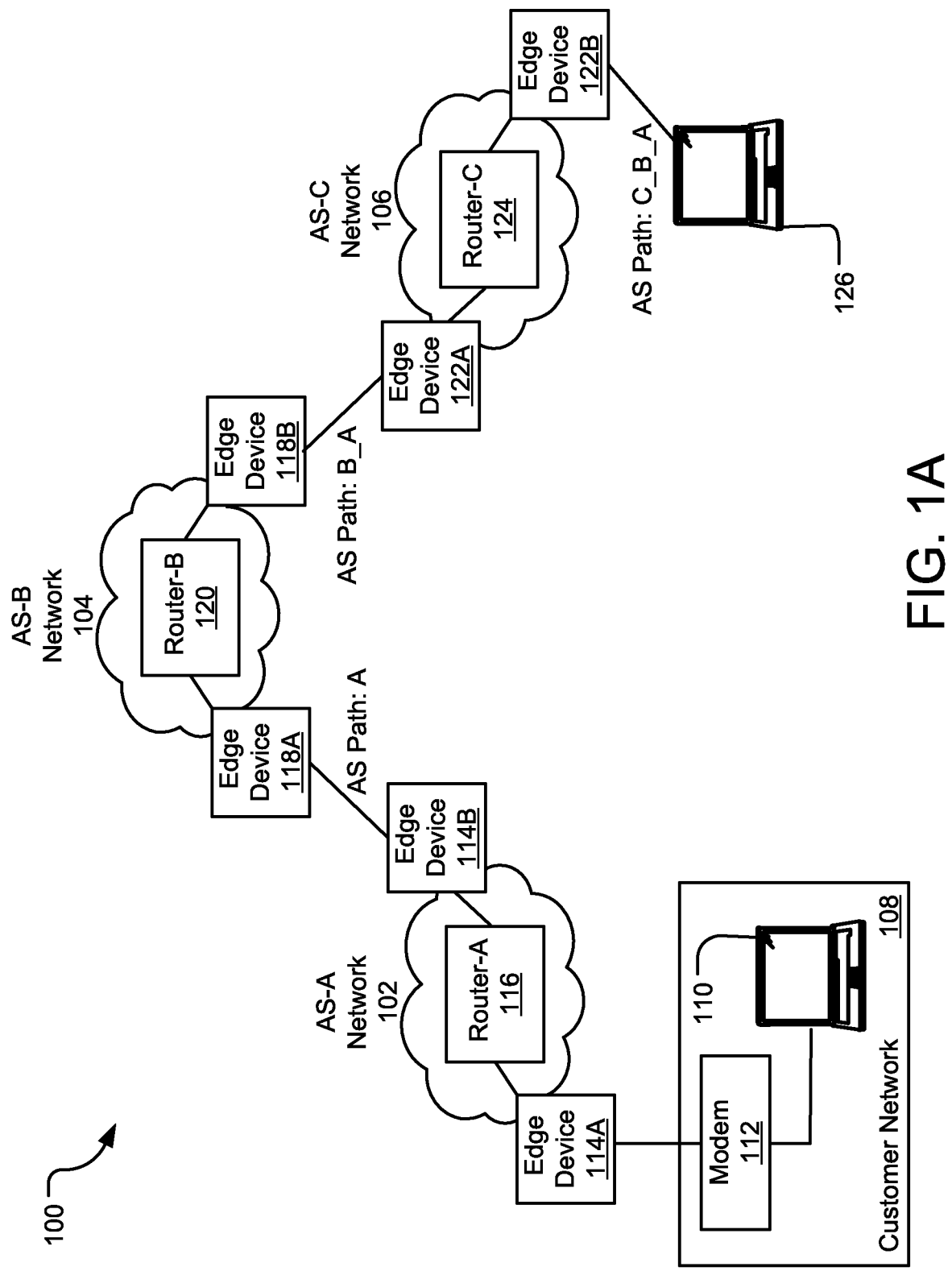
FIG. 1A is a schematic diagram illustrating an exemplary network operating environment in accordance with aspects of the present disclosure.

FIG. 1A is a schematic diagram illustrating an exemplary network operating environment 100 in accordance with aspects of the present disclosure. In general, the environment 100 provides for establishing communication sessions between network devices connected via one or more networks and/or for providing one or more network services. For example, a device 110 of customer network 108 may utilize the environment 100 to communicate or otherwise access networking device 126. In one particular instance, networking device 126 may be a content providing server of a content delivery network (CDN) such that content may be provided to the requesting customer network device 110 via the environment 100. The network environment 100 may include both public communication networks (such as the Internet) and/or private communication networks (such as a virtual private network (VPN) or other type of private network). Users of the network environment 100 may access or transmit information, conduct voice and/or video communication using communication devices, such as servers, and various user type computing devices such as tablets, laptops, IP based telephony devices, and mobile communication devices. In still another example, the network environment 100 may facilitate communications between networks managed or administered by separate entities, such as communications between IP networks 102-106. With specific reference to FIG. 1, the environment 100 includes three connected IP networks 102-106, each of which may be provided by a wholesale network service provider. However, while the environment 100 of FIG. 1 shows a configuration of IP networks 102-106, it should be appreciated that one or more of the networks may include non IP-based routing. For example, portions of network 104 may include devices utilizing time division multiplexing (TDM) or plain old telephone service (POTS) switching.

The IP networks 102-106 may include numerous components such as, but not limited to gateways, routers, route reflectors, and registrars, which enable communication and/or provides services across each IP network 102-106, but are not shown or described in detail here because those skilled in the art will readily understand these components. Each IP network 102-106, however, may include one or more edge devices and one or more routers. For example, network 102 may include at least two edge devices 114A-B and router-A 116. Each edge device 114 may provide an interface between network 102 and another network and/or another networking device. For example, edge device 114A may provide an interface with customer network 108 and edge device 114B may provide an interface with network 104. In one example, a communication from customer network 108 may be received at edge device 114A and routed to edge device 114B via router-A 116. The routing of such received communications may be based on routing information stored in routing tables of network 102, as described in more detail below.

The networks 102-106 of the environment 100 may be identified based on one or more AS identifiers, such as an AS number. The networks 102-106 may distinguish each other based on the AS identifiers. For example, network 102 may be associated with AS-A, network 104 may be associated with AS-B, and network 106 may be associated with AS-C. The AS identifier may include any alphanumeric values unique to the network associated with the AS identifier. Each AS network 102-106 may include any number of devices for routing communications into or via the network. Also, each network may include similar network devices as described above. In particular, network AS-B 104 is illustrated as included edge device 118A interfacing with network AS-A 102, router-B 120 for routing communications via network AS-B 104, and edge device 118B interfacing with network AS-C 106. Network AS-C 106 is illustrated as included edge device 122A interfacing with network AS-B 104, router-C 124 for routing communications via network AS-C 106, and edge device 122B interfacing with networking device 126. As mentioned, each network 102-106 may include additional components or devices for routing communications via the respective networks. In one example described below, the networks 102-106 may include an application server or other networking device for storing and/or generating a network model of interconnected AS networks for verification of announced routing information.

Customer network 108 may interface with network AS-A 102 and include communication devices such as, but not limited to, a personal computer 110 connected to a router/firewall 112. Although shown in FIG. 1 as computer 110, the communication devices may include any type of communication device that receives a multimedia signal, such as an audio, video or web-based signal, and presents that signal for use by a user of the communication device. The communication and networking components of the customer network 108 enable a user at the customer network to communicate via the environment 100 to other communication devices, such as another networking device 126 and/or the Internet. Components of the customer network 108 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected to network AS-A 102.

In one example, the environment 100 may provide a communication path between the computing device 110 of the customer network 108 and networking device 126. In particular, a communication intended for networking device 126 may be transmitted from modem 112 to network AS-A 102 via edge device 114A, to network AS-B 104 via router-A 116 and edge device 114B, through network AS-B 104 via edge device 118A, router-B 120, and edge device 118B, through network AS-C 106 via edge device 122A, router-C 124, and edge device 122B, and arrive at networking device 126. A response communication may follow the same networking path in reverse to arrive at computing device 110 and an exchange of communications may occur between the computing device 110 and the networking device 126. In one example, the computing device 110 may request and receive content from the networking device 126, such as a video file, audio file, document, etc.

The networks 102-106 of the environment 100 may share routing information, such as IP addresses, for routing of communications. For example, networks may announce a range of IP addresses associated with devices within the network such that other networks and devices may store the information for use in routing communications to the network. In general, IP addresses may be used by networks to identify devices associated with the communication, either as a source IP address associated with the device or network transmitting the communication or a destination IP address associated with the device or network intended to receive the communication. Network devices, such as edge devices and routers, may store routing information received from other networks for use in routing a received communication. In particular, a networking device may receive a communication, determined destination IP address included in the communication, and route the communication based on information stored in the routing table associated with the destination IP address. For example, networking device 126 may announce its IP address to network AS-C 106. Edge devices 122 and router-C 124 may store the received IP address in corresponding routing tables and, when a communication is received that includes the networking device 126 IP address as a destination address, the edge devices 122 and router-C 124 may route the communication to the networking device 126 based on the routing tables.

Further, network AS-C 106 may provide the announced IP address for the networking device 126 to network AS-B 104, which in turn may announce the IP address to network AS-A 102, and so forth. The devices of each of the networks 102,104 may also store the announced route for the networking device 126 in respective routing tables. In addition to announcing the received routes, network AS-C 106 may also announce a range of IP addresses associated with devices within network AS-C 106. In this manner, each network 102-106 may generate routing tables for routing communications within and between the networks of the environment 100 by receiving routing information, such as IP addresses associated with the announcing network and IP addresses of networks connected to the announcing network, and generating routing tables.

One particular example, announcement of routing information occurs in a Border Gateway Protocol (BGP) announcement between devices or networks. In general, BGP information (or BGP session, BGP feed or BGP data) is a table of Internet Protocol (IP) prefixes which designate network connectivity between autonomous systems (AS) or separate networks. BGP information for a network route may include path (including next-hop information), network policies, and/or rule-sets for transmission along the path, among other information. The BGP feed may also include Interior Gateway Protocol (IGP) information for network routes within an Autonomous System (AS) or network and/or other network information that pertains to the transmission of content from the network. However, BGP information mainly describes routes used by a network to connect to external networks or customers while IGP information describes routes through the network to connect one edge device (such as edge device 118A) to another edge device (such as edge device 118B) through a network 104.

One attribute of an announced BGP route may include an AS_PATH that identifies the path of AS networks that a communication traverses to reach a particular endpoint or address. For example, networking device 126 may receive an announced BGP route for transmitting communications to computing device 110 that traverses network AS-A 102, network AS-B 104, and network AS-C 106. As explained above, customer network 108 may announce the IP address for computing network 110 to network AS-A 102 through a BGP session between the networks. The devices of network AS-A 102 may store the announced IP address for the computing device 110 in routing tables within the network 102. Further, network AS-A 102 may announce the IP address for the computing device 110 to network AS-B 104 via a BGP session between network AS-A 102 and network AS-B 104. Network AS-A 102, however, may include an AS_PATH identifier in the announced route that indicates network AS-A 102 as the network through which the computing device 110 may be reached. In other words, the announced route does not indicate that the computing device 110 is located within network AS-A 102, but rather that network AS-A 102 may serve communications to the computing device 110 through the network. When communications intended for the computing device 110 are received at network AS-A 102, the network may route the communication to edge device 114A for transmission to customer network 108. Network AS-B 104, based on the AS_PATH identifier included in the route, may know that communications received at network AS-B 104 may be routed to network AS-A 102 to reach computing device 110.

Network AS-B 104 may similarly announce the route to computing device 110 to network AS-C 106. The AS_PATH portion of the BGP announcement may be amended by network AS-B 104 to add an identifier of network AS-B 104. Thus, the announced route may include an AS_PATH portion that identifies network AS-B 104 and network AS-A 102. Network AS-C 106 may similarly amend the AS_PATH portion of the route to include an AS-C identifier when announcing the route to network device 126. Network device 126, upon receiving the network, may thus determine that the route to reach the computing device 110 includes traversing network AS-C 106, network AS-B 104, and network AS-A 102, as indicated in the AS_PATH portion of the announced route.

Figure 1B:
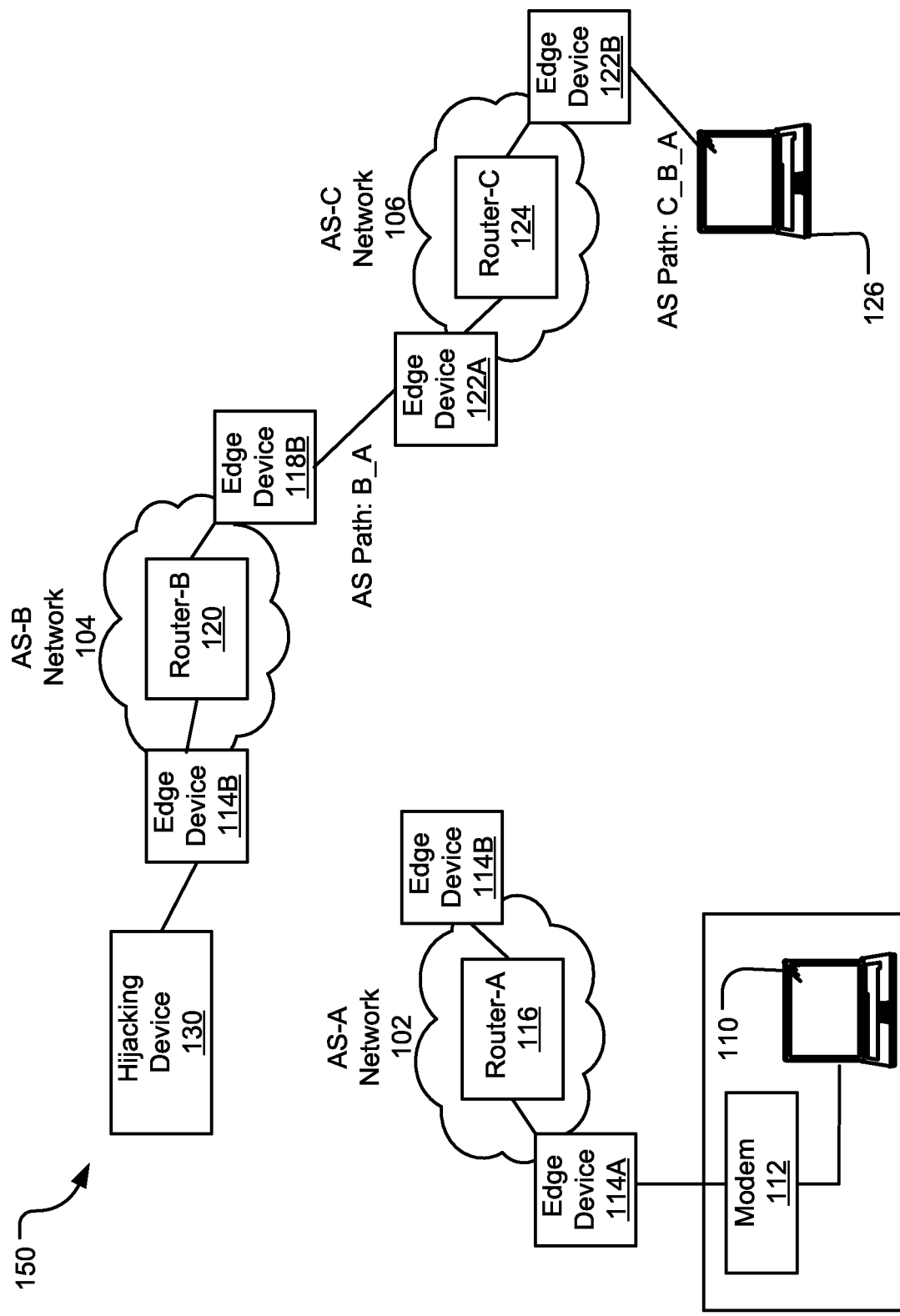
FIG. 1B is a schematic diagram illustrating the network operating environment of FIG. 1A with a Border Gateway Protocol (BGP) hijacking device intercepting communications from the network, in accordance with aspects of the present disclosure.

Although some measures have been introduced to protect the validity of announced routes between networks, some vulnerabilities exist that may allow a fraudulent actor to hijack a route to steal or otherwise obtain communications intended for a particular IP address. For example, FIG. 1B is a schematic diagram illustrating the network operating environment 150 with a BGP hijacking device 130 intercepting communications from the network, in accordance with aspects of the present disclosure. Many of the components and networks of the environment 150 of FIG. 1B are the same as discussed above with reference to FIG. 1A. However, in this instance, network AS-A 102 may not connect to network AS-B 104. As an illustration of route hijacking, a hijacking device 130 may connect to network AS-B 104 with the intention of stealing communications intended for computing device 110. The hijacking device 130 and/or network AS-B 104 may be configured to announce a route to computing device 110 that does not exist but rather directs the communications for the computing device 110 to the hijacking device 130.

Existing security measures for route announcements may prevent some hijacking of the route for the computing device 110. For example, announcing devices may request and receive a cryptographically signed certificate from a governing entity that identifies a particular device or network as the owner of an IP address. This signed certificate may be transmitted along with route announcement and decrypted by a receiving device or network to verify the announcing device or network is verified as an owner of the IP address. However, this verification process generally applies solely to the first announcement of the IP address by the device or network to which the IP address belongs. Thus, in the environment 100 of FIG. 1A, the customer network 108 may announce the IP address of the computing device 110 to network AS-A 102 along with the cryptographically signed certificate. One or more devices of network AS-A 102 may decrypt the certificate and verify that the IP address belongs to the customer network 108 and is therefore a valid route announcement. However, subsequent announcements to other AS networks (such as to network AS-B 104 and network AS-C 106) may not be similarly validated. Rather, network AS-B 104 and network AS-C 106 may assume that validation of the route has occurred and will update the AS_PATH field with a respective AS identifier when forwarding the route to the next AS in the route.

The vulnerability in the AS_PATH field of the BGP announcement may be exploited as illustrated in FIG. 1B. In particular, network AS-B 104 may be configured to announce the route to computing device 110 with a faked AS_PATH field that includes network AS-A 102, even though network AS-A 102 is not connected to network AS-B 104 in this example. Network AS-C 106 accepts the announced route as verified based on the AS_PATH field and stores a route to computing device 110 via network AS-B 104 and network AS-A 102 in the routing tables of the network. Similarly, networking device 126 may accept the announced route via the AS networks 102-106 included in the AS_PATH field and assume that communications transmitted to that address will traverse the announced route to computing device 110. However, rather than transmitting communications intended for computing device 110 to network AS-A 102, network AS-B 104 may be configured to route the communications to hijacking device 130. In this manner, the AS_PATH field of the BGP announcements may be faked to hijack communications for devices or networks for nefarious purposes. Additional security features to address the AS_PATH vulnerability of BGP routes have been slow to be adopted and/or are incompatible with current network devices for implementation on a network-wide basis.

Figure 2:
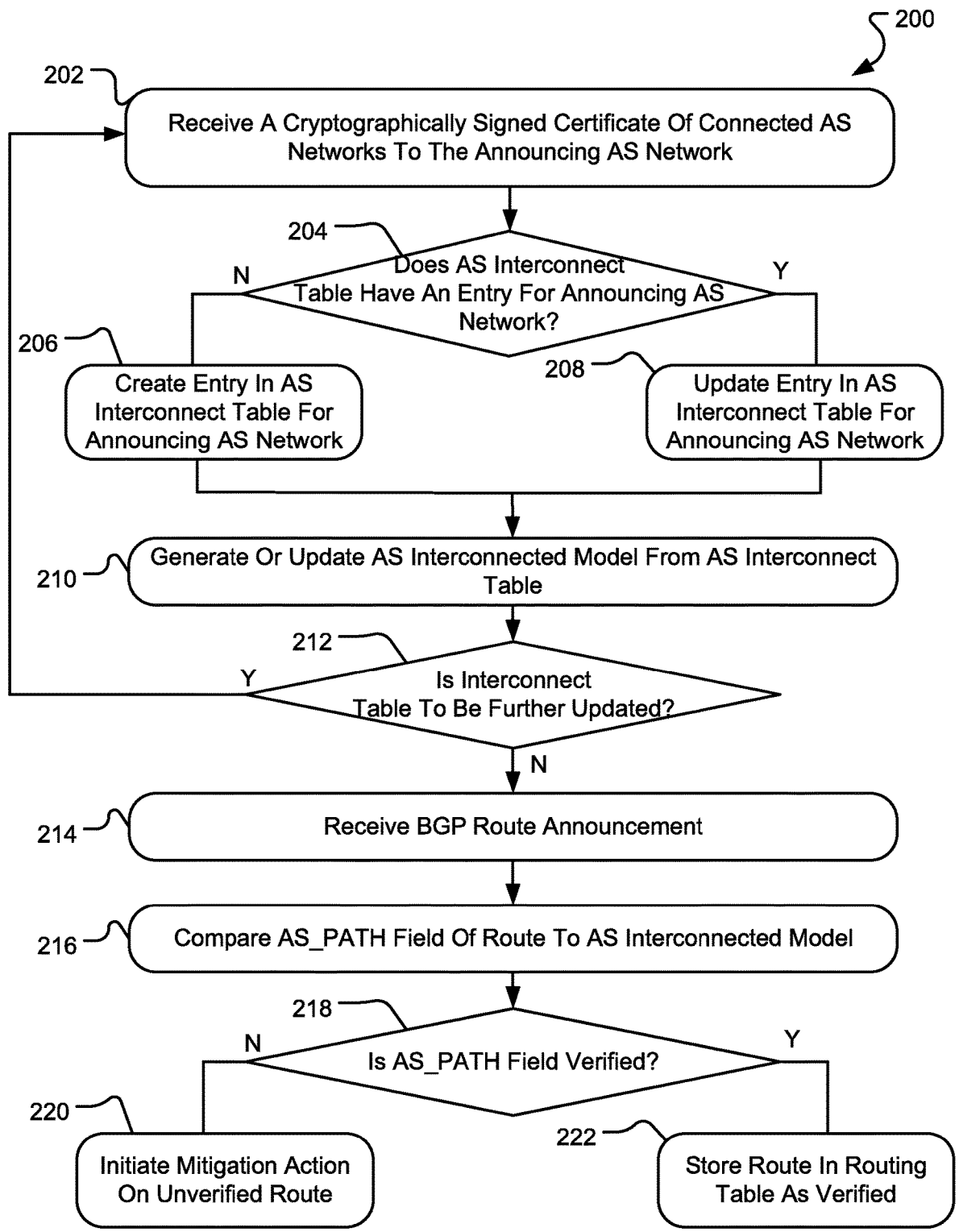
FIG. 2 is a flowchart of a method for utilizing verified autonomous system (AS) network interconnections to mitigate hijacking of network communications in downstream route announcements with aspects of the present disclosure.

FIG. 2 is a flowchart of a method 200 for utilizing verified autonomous system (AS) network interconnections to mitigate hijacking of network communications in downstream route announcements with aspects of the present disclosure. The operations of the method 200 of FIG. 2 may be performed by one or more networking devices, such as a router or application server of a network. The operations may be performed by one or more hardware components of the network device, one or more software programs, or a combination of hardware and software components of the network device.

Figure 3:
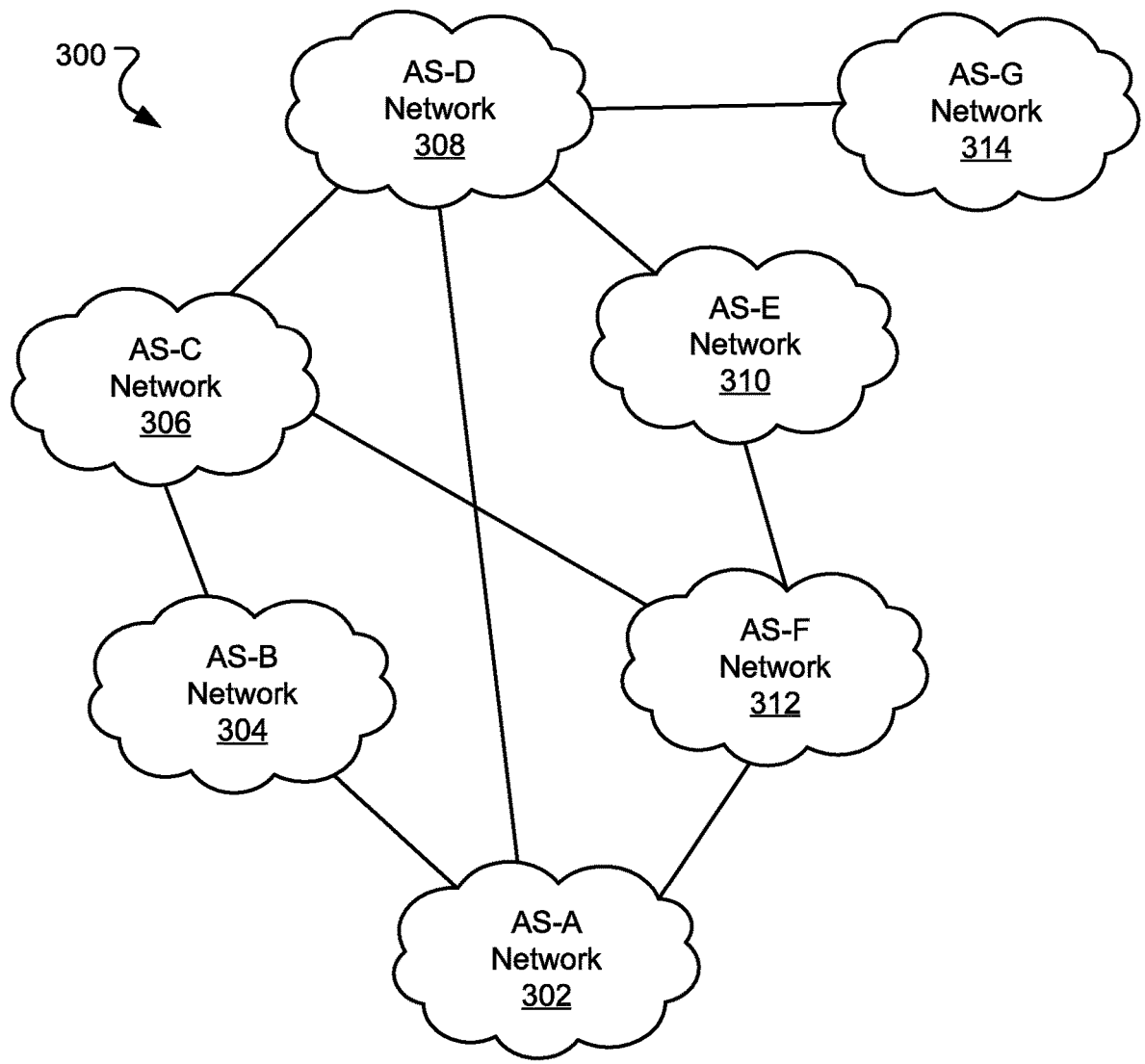
FIG. 3 is a schematic diagram of an interconnection model of multiple AS networks obtained from announced verified AS certificates in accordance with aspects of the present disclosure.

Beginning in operation 202, the network device may receive a cryptographically signed certificate or object, otherwise known as a Recognized Operating Agency (ROA) object, from an AS network. The ROA object may include a list or some other indication of the AS networks to which the announcing AS network is connected. For example, FIG. 3 is a schematic diagram 300 of an interconnection of multiple AS networks 302-314. In particular, AS networks AS-A through AS-G 302-314 are illustrated in FIG. 3, with a line between AS networks indicating an interconnection between the AS networks. For example, network AS-D 308 is illustrated at connected to network AS-C 306, network AS-A 302, network AS-E 310, and network AS-G 314. Each AS network 302-314 may be identified by a unique AS number or identifier. As should be appreciated, the illustration 300 of FIG. 3 is used herein as an example. The interconnection of AS networks may include any number of such networks interconnected in any number of ways. Further, each AS network 302-314 may generate and announce (via one or more BGP announcement sessions) an ROA object that includes a listing or other indication of the AS networks connected to the announcing network. In one instance, an administrator of the announcing AS network may generate the ROA object announcing the connection to neighbor AS networks upon receiving a connection to a new AS network. In another instance, a device of the AS network may automatically generate the ROA object with a listing of the neighboring or connected AS networks when an AS network is detected as connected. For example, network AS-G 314 may connect to network AS-D 308 and initiate a BGP session with network AS-D 308. Upon receipt of BGP information, a device of network AS-D 308 may update or generate an ROA object with the connection information to network AS-G 314.

Further, in some instances, each generated ROA object may include an encrypted signature received from a governing entity that is tasked with verifying the identity of an AS network and providing the cryptographic signature for inclusion in the ROA object from that AS network. Inclusion of the encrypted signature in the ROA object may be used to verify the identity of an AS network that generates an ROA object with interconnection information such that a network may not pose as another AS network. Also, devices of the networks 302-314 may decrypt the encrypted signature to obtain the signature and verify the identity of the sender of the ROA object based on the cryptographic signature such that the information included in the ROA object may be trusted as accurate.

Figure 4:
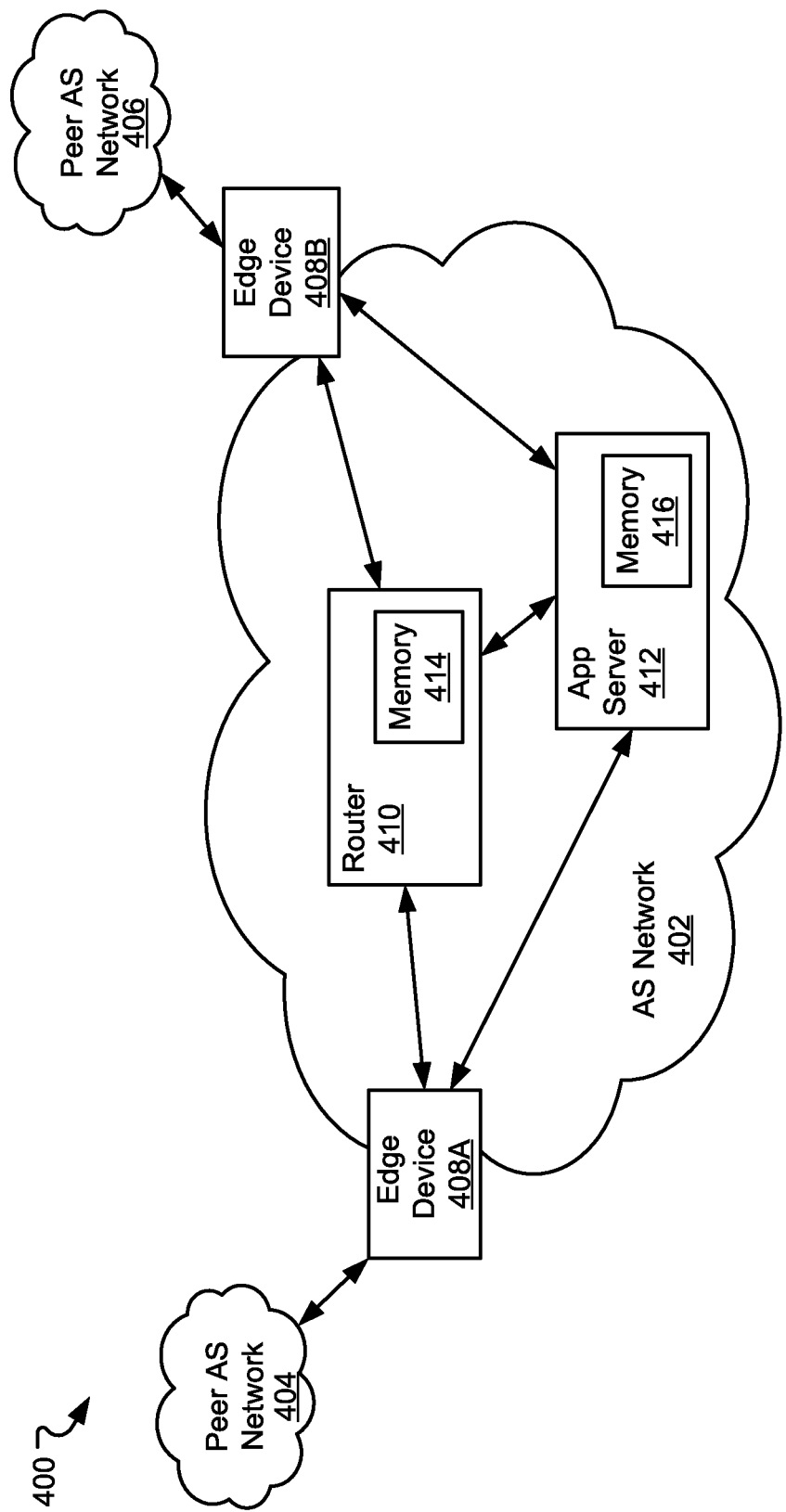
FIG. 4 is a schematic diagram of a network system for generating an interconnection model of multiple AS networks obtained from announced verified AS certificates to mitigate hijacking of network communications in downstream route announcements with aspects of the present disclosure.

Returning to method 200, the networking device may, in operation 204, determine if an AS interconnect table for the receiving network includes an entry for the AS network providing the ROA object. Returning to the example of FIG. 3, network AS-D 308 may receive ROA objects that include AS interconnection information from one or more of the other AS networks, such as network AS-A 302, network AS-B 304, etc. One or more network devices of network AS-D 308 may be used to verify the AS interconnection information included in the received ROA objects and generate a table of the interconnectedness of the AS networks from the received ROA objects. For example, FIG. 4 is a schematic diagram of a network system 400 for generating an interconnection model of multiple AS networks obtained from announced verified AS certificates to mitigate hijacking of network communications in downstream route announcements. Similar to above, the network environment 400 may include an AS network 402 (such as network AS-D) connected to peer AS networks 404,406 via one or more edge devices 408A, 408B. One or more ROA objects may be provided by the peer AS networks 404,406 to the AS network 402. In one example, the ROA objects may be announced to the devices within the AS network 402, such as router 410 and/or application server 412. As ROA objects are received from peer AS networks 404,406, the router 410 and/or the application server 412 may generate an AS interconnect table from the AS interconnection information included in the received ROA objects. Generating the AS interconnect table may include decrypting the received ROA objects, verifying the identity of the AS networks providing the ROA objects, and entering the AS interconnect information included in the ROA object into an AS interconnect table.

Table 320 of FIG. 3 illustrates an example of such an AS interconnect table. In particular, the table 320 is an AS interconnect table for network AS-D 308 of the example network configuration 300. To generate the table 320, network AS-D 308 may receive ROA objects from AS networks A-C, E, and F. The ROA objects associated with each AS network 302-312 may be provided directly to network AS-D 308 for those AS networks that connect directly to network AS-D 308, or may be provided via other AS networks, eventually being announced to network AS-D 308 in a BGP session with a connecting network. A router or application server of network AS-D 308 may obtain the AS interconnect information from each ROA object and populate the AS interconnect table 320 with the verified information. As shown in the table 320, network AS-A announces a connection to network AS-B 304, network AS-D 308, and network AS-F 312. Network AS-B announces a connection to network AS-A 302 and network AS-C 306. In a similar manner, the connected networks to AS-C 306, AS-E 310, and AS-F 312 may also be included in the AS interconnect table 320. Any number of devices in any or each of the AS networks 302-314 may similarly generate an AS interconnect table 320 for storing the AS interconnect information included in the provided ROA objects.

Returning to the method 200 of FIG. 2, the network device may determine if the AS interconnect table 320 includes an entry for the AS network from which the ROA object received. If no, the network device may create an entry in the AS interconnect table with the AS interconnect information included in the ROA object in operation 206. The entry may be similar to the entries in table 320. If the table 320 includes an entry for the AS from which the ROA object was received, the networking device may update the entry in the table 320 with the information included in the ROA object in operation 208. For example, an AS network may announce a new connection or may announce the removal of a connection in the ROA object such that the entry for that AS network in the AS interconnect table 320 may be updated accordingly.

In operation 210, the networking device may generate or update an AS interconnect model from the AS interconnect table. An AS interconnect model may contain the information included in the AS interconnect table 320, such as the AS network environment 300 corresponds to the AS interconnect table 320 of FIG. 3. In general, the AS interconnect model may take any form that is searchable by the networking device to validate a received AS_PATH, including a linked list of interconnected AS networks, a graphical representation of the interconnected AS networks, a searchable table ordered by AS identifiers, a database of AS networks and the AS networks each network is connected to, and the like. In one instance, the networking device may store the AS interconnect table 320 in a searchable format such that an AS interconnect model may not be generated. As explained in more detail below, the AS interconnect model may be utilized by the networking device to verify a received AS_PATH of an announced route.

In operation 212, the networking device may determine if additional interconnect information is to be added to the AS interconnect table 320. For example, additional ROA objects from other AS networks may be received at the networking device with additional AS network interconnect information. If additional ROA objects are received, the networking device may return to operation 202 to add a new entry into the AS interconnect table or update an entry in the table and update the AS interconnect model. If the AS interconnect table 320 is up to date, the networking device may begin verifying the AS_PATH portion of announced routes by receiving an announced BGP route in operation 214. As described above, networks and/or network devices may announce an IP address or range of IP addresses at which the networks or devices may be reached. These IP addresses may be shared through BGP sessions between devices and/or networks and may include an AS_PATH field that includes the AS networks through which the announcing device or network can be reached.

In operation 216, the networking device may, upon receiving a BGP route, obtain the AS_PATH included in the route and compare the route to the AS interconnection model generated from the AS interconnection table 320 to verify the AS_PATH information. Extending the above example, a router 410 of network AS-D 308 may receive a BGP route that includes an AS_PATH of: C_B_E, indicating that the IP address associated with the route may be reached by traversing network AS-C 306, network AS-B 304, and network AS-E 310. The router 410 may compare this AS_PATH information to the AS interconnect model 300 of FIG. 3 or the AS interconnect table 320 and determine that network AS-B 304 does not interconnect with network AS-E 310. As such, the AS_PATH information does not match the verified AS interconnect information received at the router 410 and may indicate a potential hijacking of the route by some entity or device associated with network AS-B 304. Alternatively, the AS_PATH information may include an AS_PATH of: C_B_A to reach the announced IP address. This AS path may be verified by the AS interconnect model 300 for use by the router 410 as a valid AS path based on the interconnect information received at the router 410.

In operation 218, the network device may thus determine if the AS_PATH of the announced BGP route is verified as compared to the information of the AS interconnect model or table 320. If the AS_PATH information is verified, the network device may store in the route in one or more routing tables in operation 222 as a verified route. If the route conflicts with the AS interconnect information of the model or table, the networking device may initiate one or more mitigating actions in operation 220 to denote the AS path information of the received route as unverified or potentially hijacked. The mitigation actions may include, but are not limited to, ignoring the route or otherwise not including the route in a routing table for the network, setting a "unverified route" flag or bit that indicates the route AS path could not be verified, setting an "verified route" flag or bit that indicates the route AS path was verified, de-prioritizing the route when stored in the routing table such that verified routes are selected over unverified routes, transmitting an alarm condition to a monitoring system with the route information for further investigation, and the like. In addition, AS networks may instantiate a routing rule that allows only validated routes such that invalidated routes may be blocked for transmission via the network. Through the mitigation actions, networks and network devices may prevent route hijacking through manipulation of the AS_PATH information.

As mentioned above, the router 410 of the network 402 of FIG. 4 may execute one or more of the operations of the method described. In this example, the router 410 may store the AS interconnect table 310 and/or the AS interconnect model 300 in a memory component 414 of the router device. In other instances, however, an application server 412 of the network 402 may execute the operations of the method 200 described above and store the AS interconnect table 320 and/or model 300 in a memory component 416 of the application server 412. In the instances where the AS interconnect table 320 is stored at the application server, the router 410 may, in response to receiving a route announcement, transmit the route announcements to the application server 412. The application server 412 may, in response, provide a verification of the AS_PATH information to the router 410 based on the AS interconnect table 320 or model 300, as explained above. In still another instance, the application server 412 may transmit one or more control instructions to the router 410 in response to detecting a potential hijacked route via the information of the AS_PATH. In this manner, the application server 412 may implement the mitigation policy for the AS network 402 at the router 410 while saving space in the memory of the router 410 and reducing the computational processes of the router. Updates to the mitigation policy may also be implemented via the application server 412 without altering the software of the router 410.

Figure 5:
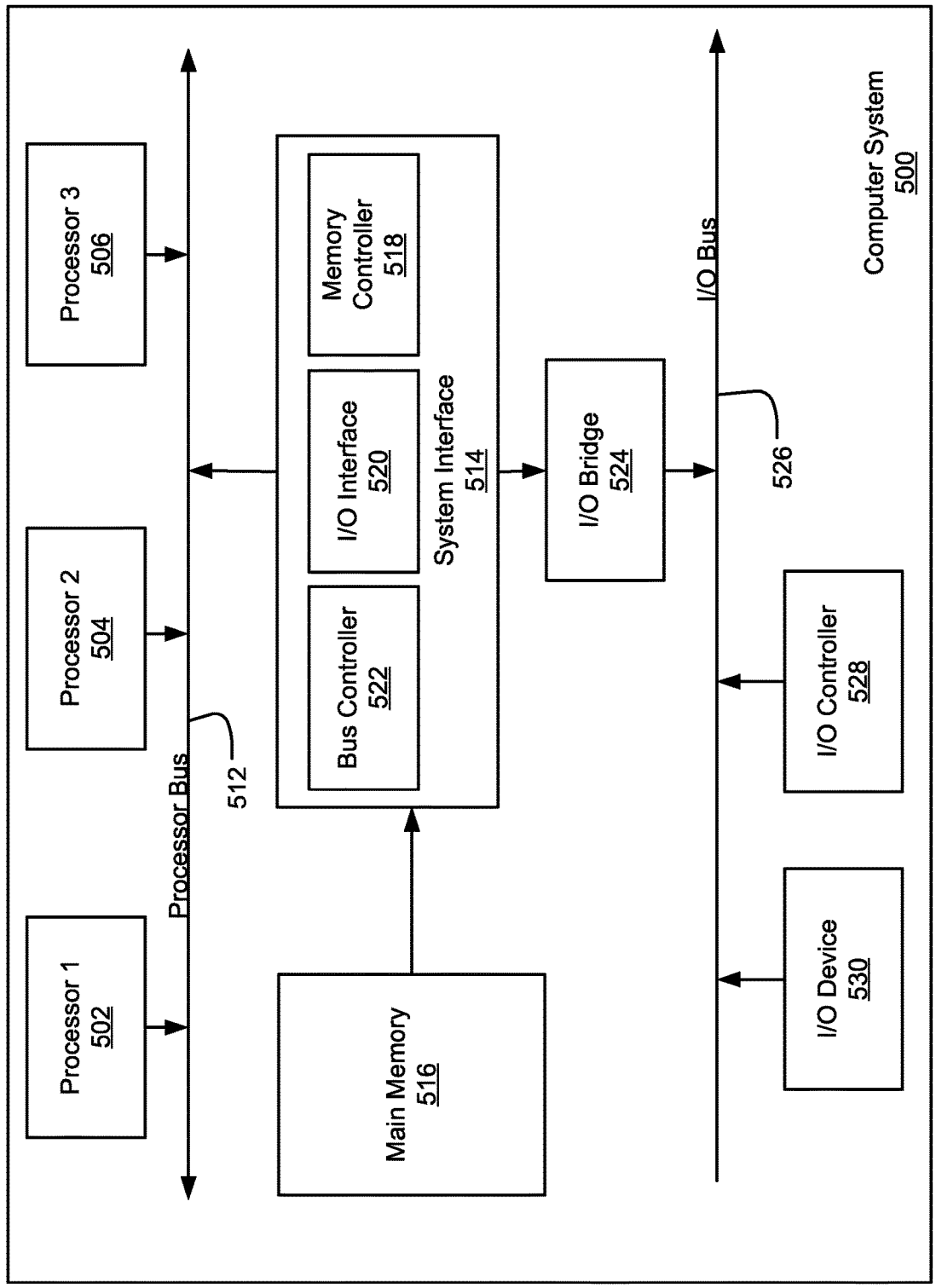
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the orchestrator 306 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for managing routes of a network, the method comprising:
    accessing, at a networking device, autonomous system (AS) network interconnection information via a route announcement from a first AS network, the AS network interconnection information comprising an indication of peer AS networks interconnected with the first AS network;
    generating, based on the AS network interconnection information, an AS network model comprising an indication of the interconnect between the first AS network and the peer AS networks;
    receiving, at the networking device, a network route comprising AS path information indicating a network path from the first AS network to at least one of a peer AS network; and
    transmitting, based on a verification of the AS path information against the AS network model, a communication via the received route,
    wherein the AS network interconnection information is provided via a Recognized Operating Agency (ROA) object transmitted from the first AS network, and
    the ROA object further comprises a cryptographic signature verifying the authenticity of the first AS network as the transmitter of the ROA object.

2. The method of claim 1 further comprising:
    decrypting the ROA object to access the AS network interconnection information; and
    comparing the decrypted signature to a database of AS signature information to verify the authenticity of the first AS network.

3. The method of claim 1 wherein the network route is received via a Border Gateway Protocol (BGP) announcement, the method further comprising:
    storing the announced route in a routing table upon verification of the AS path information.

4. The method of claim 3 further comprising:
    setting, based on the verification of the AS path information, a prioritization value associated with the announced route.

5. The method of claim 1 further comprising:
    setting a verification bit flag indicating verification of the AS path information.

6. The method of claim 1, wherein the network route is received from a router, the method further comprising:
    transmitting a control instruction to the router for storing the announced route, the control instruction applying a routing policy for the announced route.

7. A network device for managing routes of a network, the system comprising:
    a processor;
    a communication port receiving a route announcement from a first autonomous system (AS) network, the route announcement comprising AS network interconnection information of one or more peer AS networks interconnected with the first AS network; and
    a non-transitory memory comprising instructions encoded thereon, the instructions, when executed by the processor, are operable to:
        generate, based on the AS network interconnection information, an AS network model comprising an indication of the interconnect between the first AS network and the one or more peer AS networks;
        receive a network route comprising AS path information indicating a network path from the first AS network to at least one of the one or more peer AS networks; and
        transmit, based on a verification of the AS path information to AS interconnect table, a communication via the received route,
    wherein the AS network interconnection information is provided via a Recognized Operating Agency (ROA) object transmitted from the first AS network, and the ROA object further comprises a cryptographic signature verifying the authenticity of the first AS network as the transmitter of the ROA object.

8. The network device of claim 7 further comprising a database of AS signature information and wherein the instructions are further operable to:
    decrypt the ROA object to access the AS network interconnection information; and
    compare the decrypted signature to the database of AS signature information to verify the authenticity of the first AS network.

9. The network device of claim 7 wherein the network route is received via a Border Gateway Protocol (BGP) announcement and wherein the instructions are further operable to:
    store, in the non-transitory memory, the announced route in a routing table upon verification of the AS path information.

10. The network device of claim 9 wherein the instructions are further operable to:
    set, based on the verification of the AS path information, a prioritization value associated with the announced route.

11. The network device of claim 7 wherein the instructions are further operable to:
    assert a verification bit flag indicating verification of the AS path information.

12. The network device of claim 7, wherein the network route is received from a router and the instructions are further operable to:
    transmit a control instruction to the router for storing the announced route, the control instruction applying a routing policy for the announced route.

13. A telecommunications network comprising:
    a server receiving autonomous system (AS) network interconnection information via a route announcement from a first AS network, the AS network interconnection information comprising an indication of peer AS networks interconnected with the first AS network and generating, based on the AS network interconnection information, an AS interconnect table; and
    a router receiving a network route comprising AS path information indicating a network path from the first AS network to at least one of a peer AS network and verifying, based on the AS interconnect table of the server, the AS path information,
    wherein the AS network interconnection information is provided via a Recognized Operating Agency (ROA) object transmitted from the first AS network, and
    the ROA object further comprises a cryptographic signature verifying the authenticity of the first AS network as the transmitter of the ROA object.

14. The telecommunications network of claim 13 wherein the server further decrypts the ROA object to access the AS network interconnection information and compares the decrypted signature to a database of AS signature information to verify the authenticity of the first AS network.

15. The telecommunications network of claim 13 wherein the router further sets, based on the verification of the AS path information, a prioritization value associated with the announced route.

* * * * *